United States Patent [19]

Aharon

[11] Patent Number: 5,053,602

[45] Date of Patent: Oct. 1, 1991

[54] LASER BEAM DELIVERY SYSTEM

[75] Inventor: Roni Aharon, Ra'anana, Israel

[73] Assignee: Robomatix, Ltd., Petach Tikva, Israel

[21] Appl. No.: 570,853

[22] Filed: Aug. 22, 1990

[51] Int. Cl.⁵ ............................................. B23K 26/08
[52] U.S. Cl. ............................. 219/121.78; 219/121.79
[58] Field of Search .......................... 219/121.67, 121.72, 219/121.78, 121.79

[56] References Cited

U.S. PATENT DOCUMENTS

| | | | |
|---|---|---|---|
| 3,528,424 | 9/1970 | Ayres | 219/121.79 X |
| 3,913,582 | 10/1975 | Sharon | 128/303.1 |
| 3,986,767 | 10/1976 | Rexer et al. | 350/299 |
| 4,088,865 | 5/1978 | Peters et al. | 219/121.6 |
| 4,125,755 | 11/1978 | Palmquist | 219/121.6 |
| 4,317,021 | 2/1982 | Walch et al. | 219/121.67 |
| 4,431,899 | 2/1984 | Racki et al. | 219/121.67 |
| 4,465,919 | 8/1984 | Röder | 219/121.78 X |
| 4,550,241 | 10/1985 | Scott et al. | 219/121.67 |
| 4,618,758 | 10/1986 | Gilli et al. | 219/121.67 |
| 4,626,999 | 12/1986 | Bannister | 364/474 |
| 4,638,148 | 1/1987 | Shopsky | 219/497 |
| 4,650,952 | 3/1987 | Akeel | 219/121.74 |
| 4,661,681 | 4/1987 | Bannister | 219/121.78 |
| 4,677,274 | 6/1987 | Bisiach | 219/121.79 |
| 4,694,139 | 9/1987 | Roder | 219/121.78 |
| 4,695,701 | 9/1987 | Monteith et al. | 219/121.79 |
| 4,698,483 | 10/1987 | Marinoni et al. | 219/121.78 |
| 4,701,591 | 10/1987 | Masaki et al. | 219/121.77 |
| 4,825,036 | 4/1989 | Bickel et al. | 219/121.78 |

FOREIGN PATENT DOCUMENTS

| | | | |
|---|---|---|---|
| 2592824 | 7/1987 | France | 219/121.64 |
| 59-21491 | 2/1984 | Japan | 219/121.74 |
| 2134071 | 8/1984 | United Kingdom | 219/121.78 |

Primary Examiner—C. L. Albritton
Attorney, Agent, or Firm—Cushman, Darby & Cushman

[57] ABSTRACT

A laser beam delivery system is disclosed which includes laser apparatus for producing a laser beam, follower nozzle apparatus for receiving the laser beam and for directing the laser beam to impinge upon a workpiece and polar motion apparatus for moving the follower nozzle apparatus in a polar coordinate system and for directing the laser beam from the laser apparatus to the follower nozzle apparatus. The polar motion apparatus includes apparatus for receiving the laser beam along a first non-translatory rotation axis and for directing the laser beam along a second non-rotary translation axis, wherein the second axis is orthogonal to the first axis.

11 Claims, 7 Drawing Sheets

LASER BEAM DELIVERY SYSTEM

FIELD OF THE INVENTION

The present invention relates to laser cutting, welding and heat transfer systems generally and to such laser beam delivery systems which use a polar coordinate system in particular.

BACKGROUND OF THE INVENTION

Various laser beam delivery systems are known in the art. For instance, Applicant's U.S. patent application Ser. Nos. 07/356,992 and 07/346,620 respectively U.S. Pat Nos. 4,972,062 and 4,967,053 describe laser beam delivery systems which produce five dimensional motion utilizing three or four mirrors, depending on the embodiment.

In addition, the following U.S. Patents describe laser beam delivery systems U.S. Pat. Nos.; 3,913,582, 3,986,767, 4,088,865, 4,125,755, 4,317,021, 4,431,899, 4,550,241, 4,618,758, 4,626,999, 4,650,952, 4,638,143 and 4,661,681, 4,677,274, 4,694,139, 4,695,701 4,698,483, 4,701,591, 4,825,036. British Patent 2,134,071, French Patent Publication 2,592,824, and Japanese Patent Publication 59-21491 also describe laser beam delivery systems.

Some conventional robotic systems utilize direct drive motors. Applicant does not know of any laser beam delivery systems which utilize direct drive motors.

SUMMARY OF THE INVENTION

It is an object of the present invention to provide a laser beam delivery system which utilizes a direct drive motor and which typically produces polar coordinate motion generally for two-dimensional motion. The system of the present invention can also produce five-dimensional motion.

There is therefore provided, in accordance with a preferred embodiment of the present invention, a laser beam delivery system including laser apparatus for producing a laser beam, follower nozzle apparatus for receiving the laser beam and for directing the laser beam to impinge upon a workpiece and polar motion apparatus for moving the follower nozzle apparatus in a polar coordinate system and for directing the laser beam from the laser apparatus to the follower nozzle apparatus. The polar motion apparatus includes apparatus for receiving the laser beam along a first non-translatory rotation axis and for directing the laser beam along a second non-rotary translation axis, wherein the second axis is orthogonal to the first axis.

Further, in accordance with a preferred embodiment of the present invention, the polar motion apparatus includes rotation apparatus for rotating the follower nozzle apparatus about the first axis and translation apparatus for translating the follower nozzle apparatus along the second axis. The rotation apparatus typically includes a direct drive motor. It also typically includes a large diameter bearing.

Additionally, in accordance with a preferred embodiment of the present invention, the follower nozzle apparatus includes motion apparatus having one degree of freedom. Alternatively, the follower nozzle apparatus can include motion apparatus having three degrees of freedom.

Moreover, in accordance with a preferred embodiment of the present invention, the translation apparatus includes a non-translatory beam and motor apparatus for translating the follower nozzle apparatus along the non-translatory beam. The non-translatory beam is typically located along the second axis. Alternatively, the non-translatory beam can be located parallel to the second axis.

Finally, in accordance with a preferred embodiment of the present invention, the apparatus for receiving includes a first mirror located at the intersection of the first and the second axes. The follower nozzle apparatus typically includes a second mirror. Alternatively, the apparatus for receiving includes a first mirror located at the intersection of the first and the second axes, a third mirror located off the first axis and above the second axis, and a fourth mirror located along the second axis.

BRIEF DESCRIPTION OF THE DRAWINGS

The present invention will be understood and appreciated more fully from the following detailed description taken in conjunction with the drawings in which.

DETAILED DESCRIPTION OF THE PRESENT INVENTION

Figure 1:
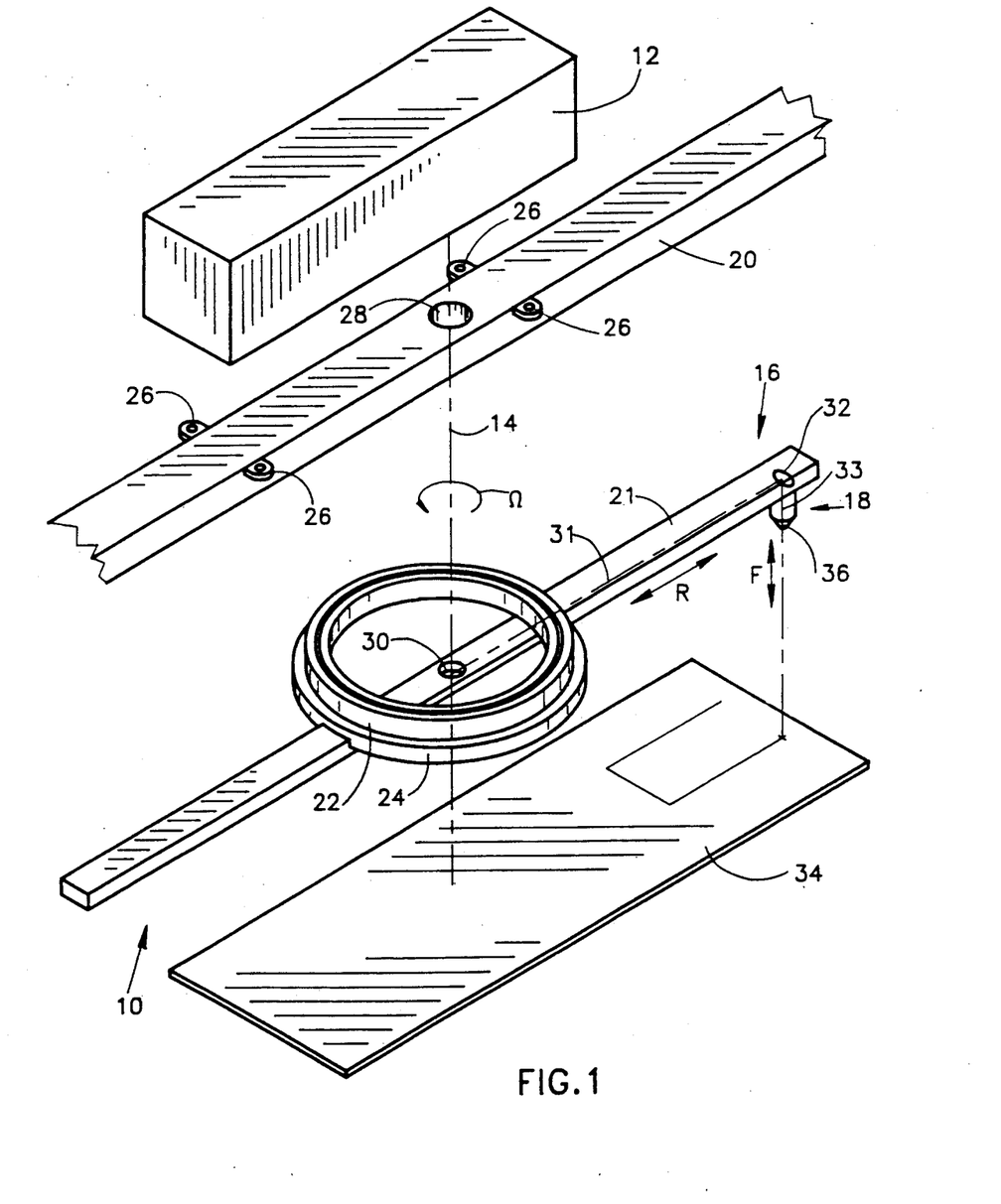
FIG. 1 is an expanded, schematic illustration of a laser beam delivery system constructed and operative in accordance with a preferred embodiment of the present invention.

Reference is now made to FIG. 1 which illustrates, in expanded form, a laser beam delivery system 10 constructed and operative in accordance with a preferred embodiment of the present invention. The laser beam delivery system 10 comprises a laser source 12, such as the MF1500P manufactured by Ferranti of Scotland, for providing a laser beam 14 and two dimensional motion apparatus 16 for moving a follower nozzle 18 in a polar coordinate (R-omega) system. Motion apparatus 16 typically is attached to a structural support system, such as a structural beam 20, which can be attached to the floor, ceiling or walls of a workplace.

Motion apparatus 16 typically comprises a hollow beam 21, typically designed to be light and stiff, which is rotated in an angular direction about the axis of laser beam 14 by a hollow, circular, direct drive DC servo motor 22, such as the SMOP-3 manufactured by Precilec of France. The angular motion is denoted by an arrow marked $\Omega$.

The direct drive motor 22 is attached to structural beam 20 via a thin section, large diameter bearing 24, such as the pre-loaded cross-roller bearings manufactured by THK. The laser source 12 typically is located on top of the structural beam 20 and is connected thereto via bolts, for which holes connection flanges 26 are shown.

A hole 28 is provided in structural beam 20 to enable laser beam 14 to pass through it to a first mirror 30 located generally at the center point of motion apparatus 16 but on hollow beam 21. First mirror 30 directs laser beam 14, labeled thereafter 31, in a radial direction, labeled R, along hollow beam 21 towards follower nozzle 18. A second mirror 32 is attached to follower nozzle 18 and directs laser beam 31, labeled thereafter 33, into follower nozzle 18 for impinging upon a workpiece 34.

The follower nozzle 18 is typically located at right angles to hollow beam 21 and typically comprises a nozzle 36 in which is located a lens 38, described hereinbelow with reference to FIGS. 2A-2C, for focusing the laser beam 33, and a capacitive focus follower sensor 76, described in more detail with reference to FIGS. 3A-3C, such as those manufactured by Weidmuller of West Germany, for detecting the location of the surface of workpiece 34. In response to output from the follower sensor, follower nozzle 18 moves lens 38, in a translatory direction marked F, such that the focal point of lens 38 is on the surface of workpiece 34.

To reach a given polar coordinate plane, direct drive motor 22 simultaneously rotates hollow beam 21 to the given angular position while follower nozzle 18 translates, via translation apparatus described hereinbelow with respect to FIGS. 3A-3C, along hollow beam 21 to the given radial position.

It will be appreciated that the system as shown in FIG. 1 is typically utilized for producing two-dimensional cuts. With regards to prior art gantry systems used for producing two-dimensional cuts, the present system does not require the accuracy of machining and placement as required by gantry systems since the main moving part is a highly accurate, direct drive motor with no transmission to a highly accurate, rotary bearing.

Furthermore, prior art systems typically require complicated transmission systems to produce motion of the follower nozzle 18. The present system has eliminated the prior art transmission systems through use of the direct drive motor 22.

Still further, prior art systems typically translate and rotate fairly massive structures. The system of the present invention rotates a generally light structure and translates an even lighter structure, namely that of the follower nozzle 18 only. This provides the system of the present invention with generally very good performance at very high cutting speeds, such as 20-60 meters/min.

Figure 2A:
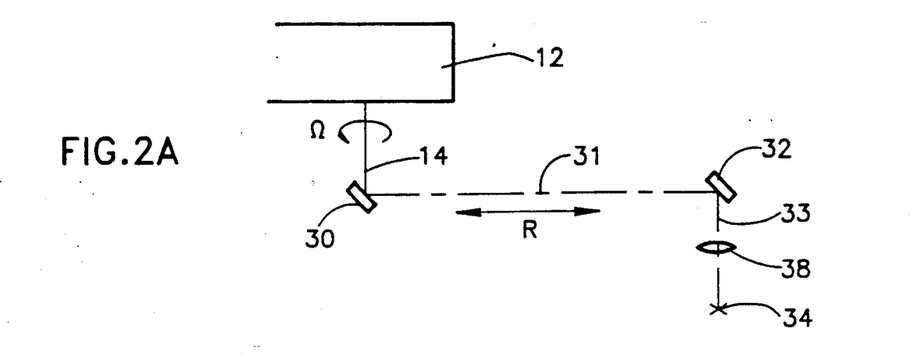
FIGS. 2A-2C are schematic illustrations of paths of a laser beam through three embodiments of the system of FIG. 1.
Figure 2B:
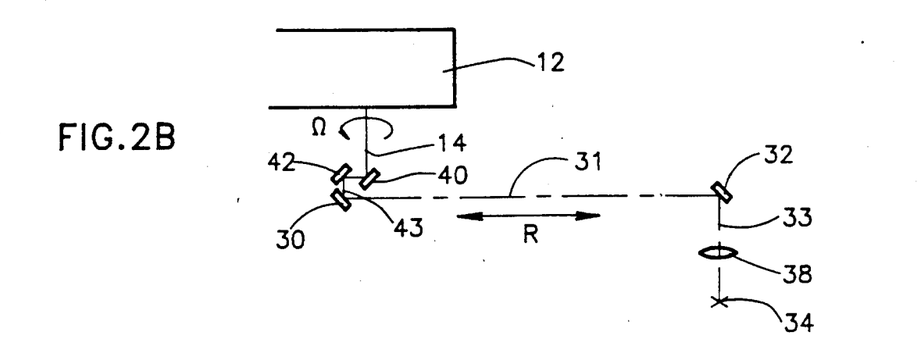
Figure 2C:
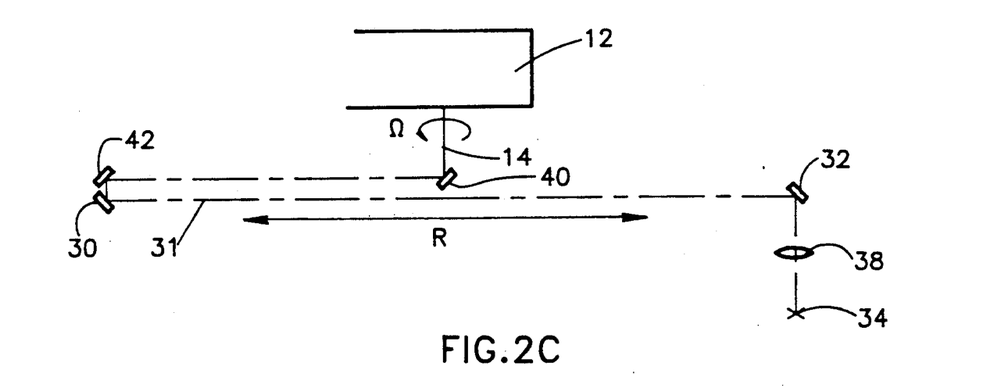

Reference is now made to FIGS. 2A-2C which illustrate three alternative paths for laser beams 14, 31 and 33. FIG. 2A illustrates the laser beam path described hereinabove; specifically, laser source 12 produces laser beam 14 which impinges upon mirror 30 which directs it, as laser beam 31, towards mirror 32. Mirror 32 directs laser beam 31, as laser beam 33, towards workpiece 34, marked with an asterisk, through lens 38. Lens 38 is typically a miniscus or asperoid ZnSe lens.

The embodiment of FIG. 2A produces polar coordinate motion, as noted by the arrows marked R and omega. However, it does not have a full working envelope; it cannot produce motion close to the origin of the polar coordinate plane, since mirror 30 is located there.

FIG. 2B illustrates an embodiment of the laser beam path which can produce motion close to and through the origin of the polar coordinate plane. Laser source 12 produces a laser beam 14 which impinges upon a mirror 40, located along the axis of laser beam 14. Mirror 40 directs laser beam 14, as laser beam 41, towards a mirror 42, located close to, but off center from, mirror 40. Mirror 42 directs laser beam 41, as laser beam 43, towards mirror 30, which, in turn, directs laser beam 43, as laser beam 31, towards mirror 32. Mirror 32 directs laser beam 31, as beam 33, through lens 38 and onto workpiece 34.

It will be noted that mirrors 40 and 42 are located in a horizontal plane above that defined by mirrors 30 and 32. This enables the system to have a full working envelope, including motion close to the origin of the polar coordinate plane. It will be noted that mirrors 40, 42 and 30 are typically fixed with respect to the translatory motion of mirror 32.

FIG. 2C illustrates a further embodiment of the embodiment of FIG. 2B where mirrors 42 and 30 are displaced to fixed locations at one end of hollow beam 21. In this embodiment, mirror 32 is free to move along the entire length of hollow beam 21.

Figure 3A:
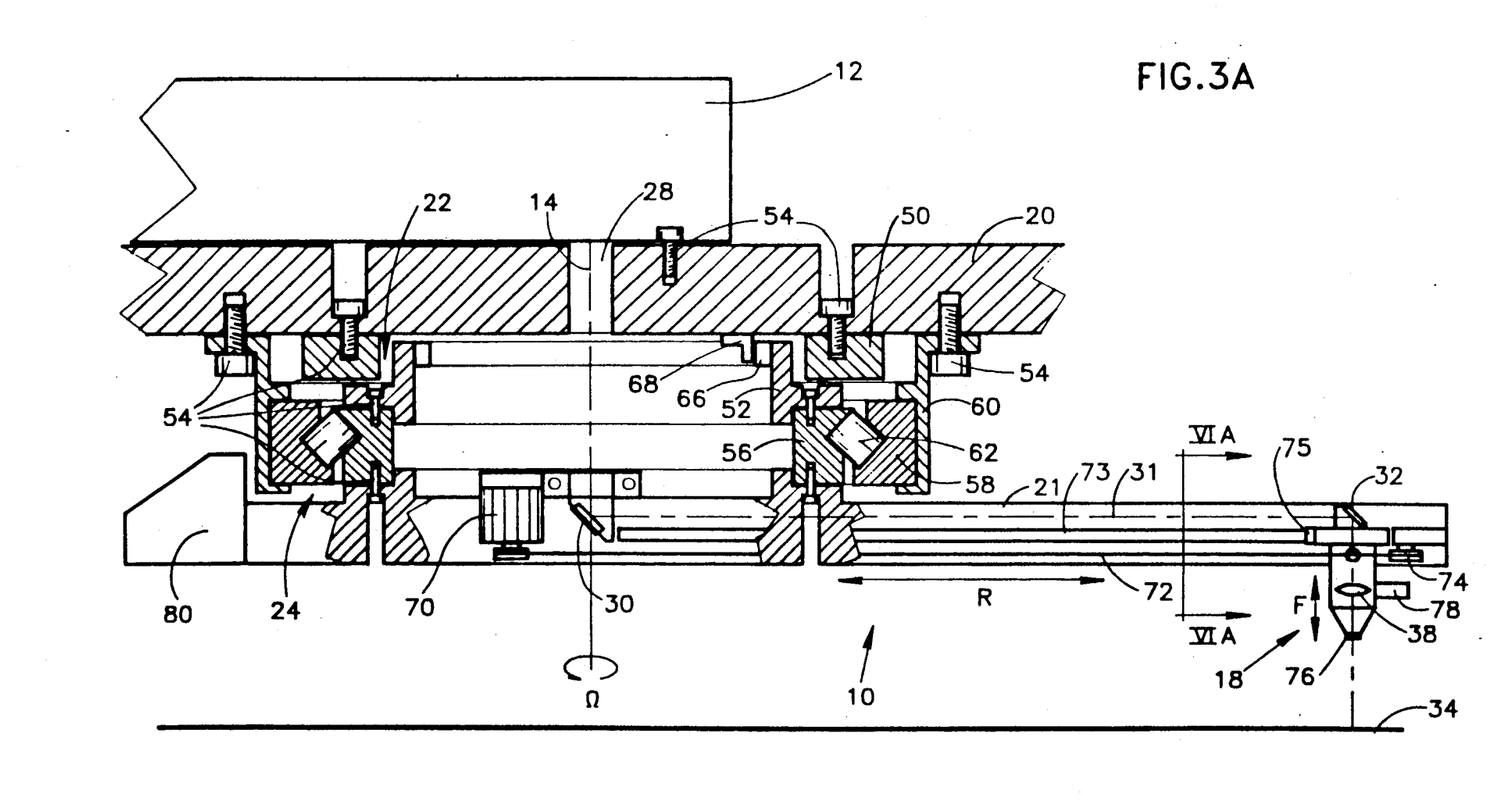
FIGS. 3A-3C are detailed illustrations of the elements of the system of FIG. 1 using the laser beam paths shown, respectively, in FIGS. 2A-2C.
Figure 3B:
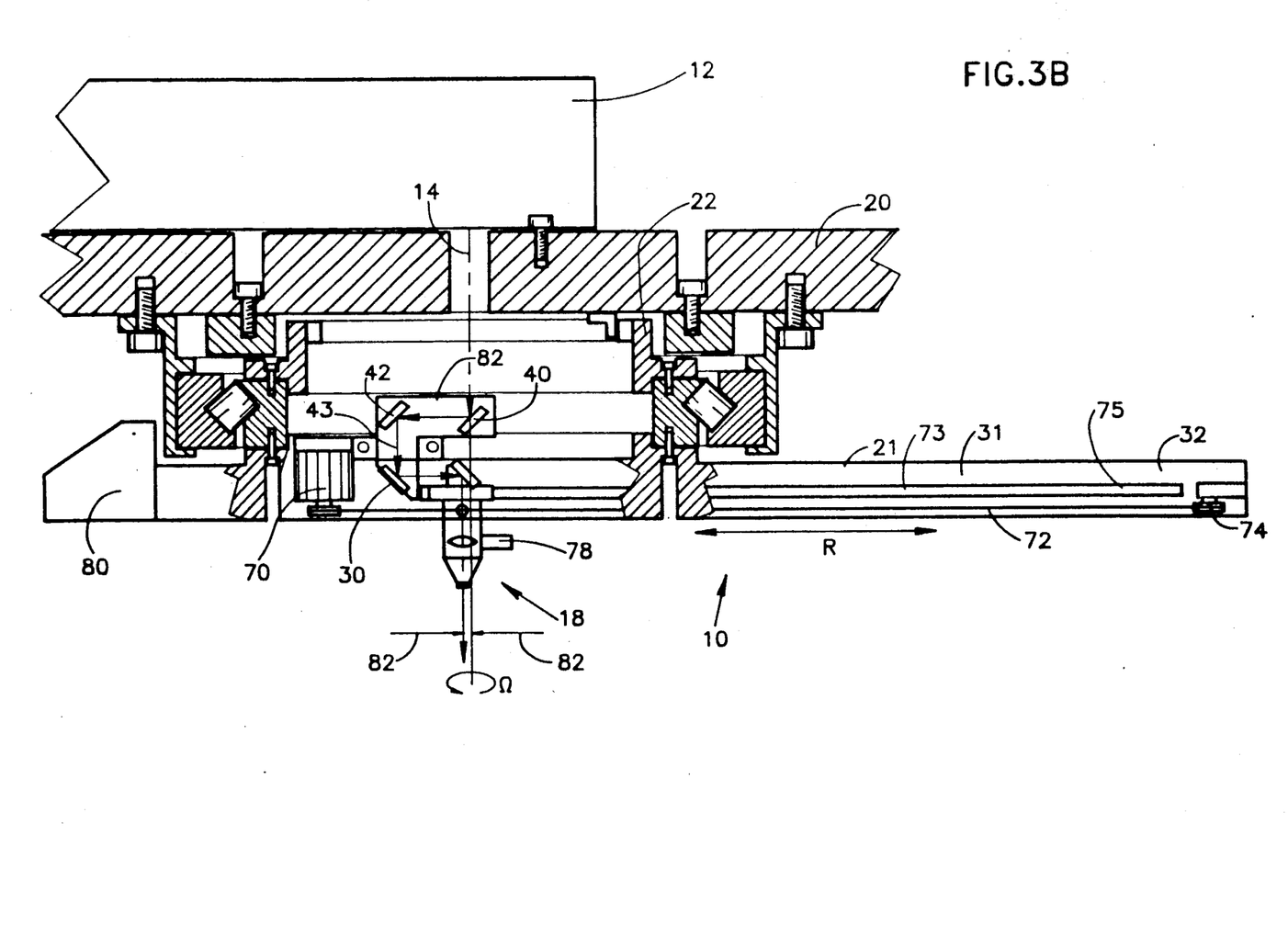
Figure 3C:
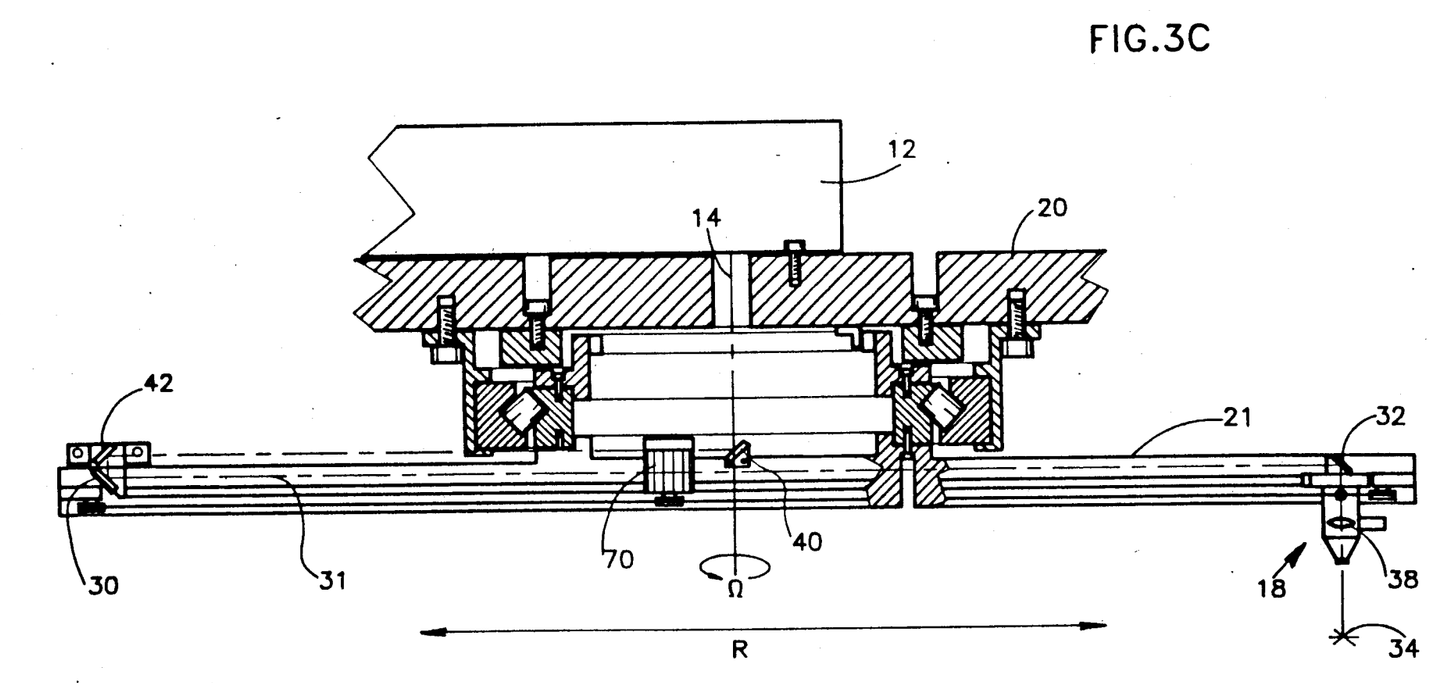

Reference is now made to FIGS. 3A-3C which illustrate, in a more detailed manner, the embodiments of FIGS. 2A-2C. Direct drive motor 22 typically comprises a circular stator 50 and a circular rotor 52. The circular stator 50 is typically fixed and is attached, typically via locking screws 54, to structural beam 20. Circular rotor 52 is attached to an inner race 56 of bearing 24 and is free to rotate in response to the amount of current applied to direct drive motor 22. An outer race 58 of bearing 22 is attached to a housing 60 which, in turn, is attached to structural beam 20. It will be noted that the inner and outer races 56 and 58, respectively, are combined together via cross rollers 62.

Direct drive motor 22 is controlled via a high resolution hollow encoder, such as the ERO 725 modular angle measuring assembly manufactured by Heidenhain of West Germany, comprised of a circular scale 66 and a detector 68. Circular scale 66 is attached to, and rotates with, rotor 52. Detector 68 is typically fixed and is typically attached to structural beam 20.

Hollow beam 21, typically manufactured of a light material, such as a light alloy of aluminum or a plastic composite, and designed so as to have a high stiffness coefficient, is typically attached to the inner race 56 of bearing 22 and thus, can rotate along with circular stator 50.

Attached to or located within hollow beam 21 is typically follower translation apparatus comprising a motor 70, such as a DC servo motor, a timing wheel 74 and a timing belt 72 for translating follower nozzle 18 and a highly accurate linear rail 73 along which follower nozzle 18 translates. Follower nozzle 18 typically comprises a linear bearing 75 which slides along linear rail 73. The linear rail 73 and the linear bearing 75 are typically the Ball Rail System, type 1601, size 15 manufactured by Star of West Germany. Follower translation apparatus is operative to move follower nozzle 18 to a given radial location.

To ensure the accuracy of the follower nozzle 18 movement, a rotary encoder can be placed on motor 70, or a linear encoder can be placed on linear rail 73.

As mentioned hereinabove, follower nozzle 18 comprises lens 38 and capacitive focus sensor 76. In response to output from sensor 76, a follower motor 78, such as a DC servo motor, moves follower nozzle 18 to a defined distance from workpiece 34.

As can be seen in FIG. 3A, mirror 30 is attached to hollow beam 21 and is located at the center of bearing 24 inside hollow beam 21. Thus, it rotates with hollow beam 21.

Mirror 32, on the other hand, is attached to follower nozzle 18 and translates along with it, up to the location of mirror 30.

Attached to hollow beam 21 and behind mirror 30 is a balance ballast 80, for balancing hollow beam 21 and for keeping it in a generally precise horizontal plane.

It will be appreciated that, in the embodiment of FIG. 3A, mirror 30 must be located at the center of bearing 24.

FIG. 3B illustrates the embodiment of FIG. 2B where elements common with FIG. 3A are given identical reference numbers. In FIG. 3B, follower nozzle 18 is located at its extreme location, past the origin of the polar coordinate system. Mirrors 40, 42 and 30 are attached to a mirror apparatus 82 which is attached to hollow beam 21. Mirror 43 30 located such that follower nozzle 18 can reach and overshoot the axis of laser beam 14. This is indicated in FIG. 3B by arrows 84.

FIG. 3C illustrates the embodiment of FIG. 2C where elements common with FIGS. 3A and 3B are given identical reference numbers. Mirror 40 is attached to hollow beam 21 and is located at the center of motor 22. Mirrors 42 and 30 are combined together and are located at one end of hollow beam 21. In this embodiment, a ballast is not necessary.

Figure 4:
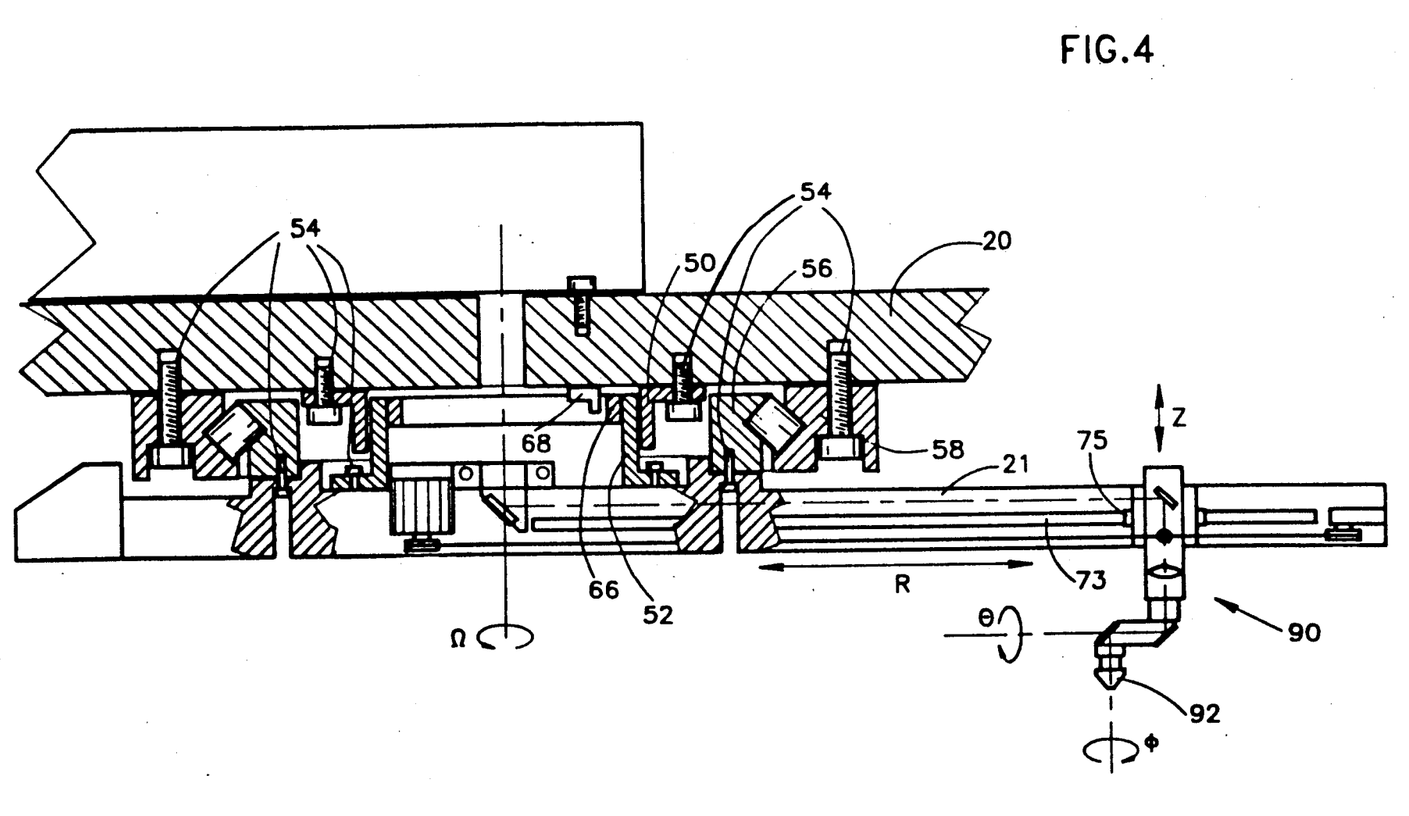
FIG. 4 is a detailed illustration of an alternative embodiment of the system shown in FIG. 3A.

Reference is now made to FIG. 4 which illustrates an alternative embodiment of the system of FIG. 3A which does not utilize housing 60. The outer race 58 of bearing 24 and the stator 50 of motor 22 are directly attached to structural beam 20 typically via locking screws 54. The inner race 56 of bearing 24 and the rotor 52 of motor 22 are attached to hollow beam 21. The remaining elements of the laser beam delivery system operate as described hereinabove.

It will be appreciated that follower nozzle 18 can be replaced by conventional three-dimensional follower apparatus 90 which typically produces motion in one translatory direction (labeled Z) and two rotatary directions (labeled Θ and φ). A tip 92 of apparatus 90 typically includes capacitive sensor 76 and lens 38.

Figure 5:
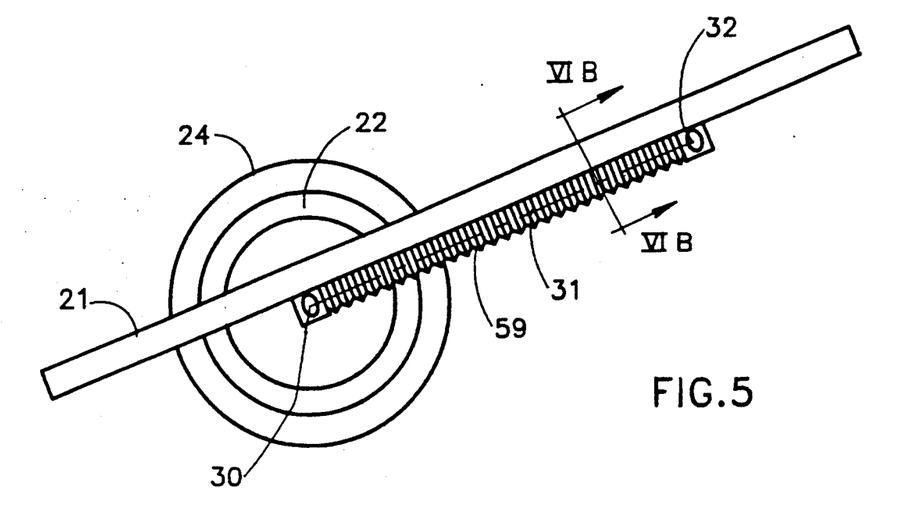
FIG. 5 is a schematic illustration of a laser beam delivery system of the present invention wherein the laser path is alongside a hollow beam.

Mirror 30 of FIG. 3A or mirror 40 of FIGS. 3B and 3C can be located within hollow beam 21, as in the previous embodiments, or without hollow beam 21, as shown in FIG. 5 to which reference is now made. FIG. 5 illustrates the case for the laser beam path of FIG. 2A and is a top view of the laser beam delivery system of the present invention. In this embodiment, the hollow beam 21 is located parallel to axis formed by light beam 31. A flexible cover, such as bellows 59, must be included between mirror 30 and mirror 32, on the follower nozzle 18, to maintain the laser beam 31 within an environmentally closed system.

Figure 6A:
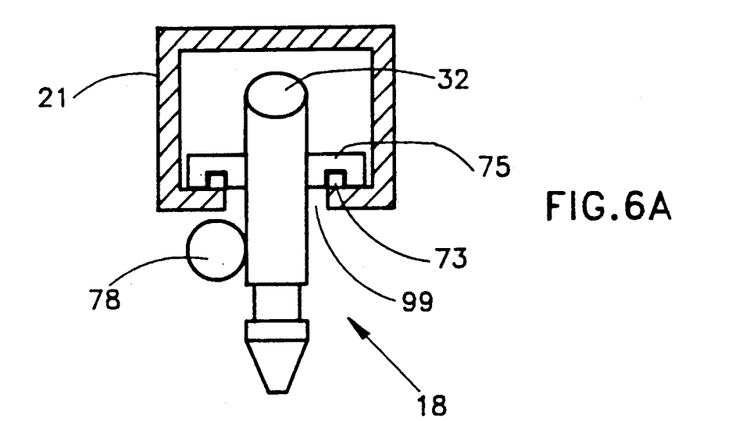
FIGS. 6A and 6B are cross-sectional illustrations of the hollow beam for the embodiments of FIGS. 3A and 5.
Figure 6B:
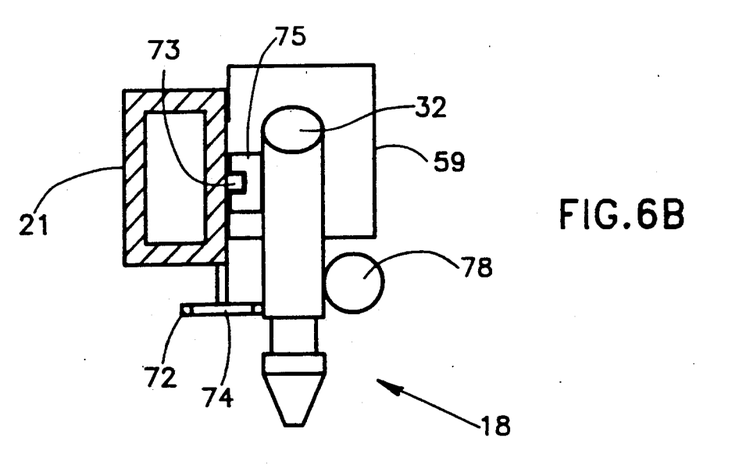

Reference is now made to FIGS. 6A and 6B which illustrate, in cross-section, the hollow beam 21 and the follower nozzle 18 for the embodiments of FIGS. 3A and 5 respectively. In FIG. 6A, the follower nozzle 18 slides along the bottom of the hollow beam 21, shown as a hollow rectangular element with an opening 99 through which slides follower nozzle 18. In FIG. 6B, the follower nozzle 18 slides along the side of hollow beam 21, shown as a hollow, closed rectangular element onto which is attached linear rail 73.

It will be appreciated by persons skilled in the art that the present invention is not limited to what has been particularly shown and described hereinabove. Rather the scope of the present invention is defined only by the claims which follow:

I claim:

1. A laser beam delivery system comprising:
    laser means for producing a laser beam;
    follower nozzle means for receiving said laser beam and for directing said laser beam to impinge upon a workpiece; and
    polar motion means for moving said follower nozzle means in a polar coordinate system and for directing said laser beam from said laser means to said follower nozzle means, said polar motion means including means for receiving said laser beam along a first non-translatory rotation axis and for directing said laser beam along a second non-rotary translation axis, wherein said second axis is orthogonal to said first axis.

2. A laser beam delivery system according to claim 1 and wherein said polar motion means comprise rotation means for rotating said follower nozzle means about said first axis and translation means for translating said follower nozzle means along said second axis.

3. A laser beam delivery system according to claim 2 and wherein said rotation means comprise a direct drive motor.

4. A laser beam delivery system according to claim 2 and wherein said rotation means comprise a large diameter bearing.

5. A laser beam delivery system according to claim 1 and wherein said follower nozzle means comprise motion means having one degree of freedom.

6. A laser beam delivery system according to claim 1 and wherein said follower nozzle means comprise motion means having three degrees of freedom.

7. A laser beam delivery system according to claim 2 and wherein said translation means comprise a non-translatory beam and motor means for translating said follower nozzle means along said non-translatory beam.

8. A laser beam delivery system according to claim 7 and wherein said non-translatory beam is located along said second axis.

9. A laser beam delivery system according to claim 7 and wherein said non-translatory beam is located parallel to said second axis.

10. A laser beam delivery system according to claim 1 and wherein said means for receiving comprise a first mirror located at the intersection of said first and said second axes and wherein said follower nozzle means comprise a second mirror.

11. A laser beam delivery system according to claim 1 and wherein said means for receiving comprise a first mirror located at the intersection of said first and said second axes, a third mirror located off said first axis and above said second axis, and a fourth mirror located along said second axis.

* * * * *